United States Patent
Wigerud

(10) Patent No.: US 7,633,519 B2
(45) Date of Patent: Dec. 15, 2009

(54) METHOD AND APPARATUS FOR SIMPLIFYING MARSHALLING WITH A VEHICLE

(75) Inventor: Ulf Wigerud, Torslanda (SE)

(73) Assignee: Volvo Lastvagnar AB, Gothenburg (SE)

( * ) Notice: Subject to any disclaimer, the term of this patent is extended or adjusted under 35 U.S.C. 154(b) by 566 days.

(21) Appl. No.: 11/160,316

(22) Filed: Jun. 17, 2005

(65) Prior Publication Data

US 2006/0099067 A1    May 11, 2006

Related U.S. Application Data

(63) Continuation of application No. PCT/SE03/01779, filed on Nov. 13, 2003, now abandoned.

(30) Foreign Application Priority Data

Dec. 17, 2002 (SE) .................................... 0203732

(51) Int. Cl.
  *H04N 7/18* (2006.01)
(52) U.S. Cl. ...................... 348/148; 348/143
(58) Field of Classification Search ................. 348/118, 348/143, 148
  See application file for complete search history.

(56) References Cited

U.S. PATENT DOCUMENTS

| 4,214,266 A | 7/1980 | Myers |
| 6,222,447 B1 | 4/2001 | Schofield et al. |
| 2001/0017591 A1 | 8/2001 | Kuriya et al. |
| 2002/0149673 A1 * | 10/2002 | Hirama et al. .............. 348/118 |

FOREIGN PATENT DOCUMENTS

| EP | 1022903 A2 | 7/2000 |
| EP | 1065642 A2 | 1/2001 |
| EP | 1102226 A2 * | 5/2001 |
| JP | 2000280822 A | 10/2000 |
| JP | 2001010431 A | 1/2001 |
| JP | 2002019492 A | 1/2002 |
| JP | 20020149673 A | 5/2002 |
| WO | WO 01/24527 A1 | 4/2001 |

* cited by examiner

*Primary Examiner*—Allen Wong
(74) *Attorney, Agent, or Firm*—Novak Druce + Quigg LLP

(57) ABSTRACT

A marshalling method and apparatus (2) for a motor vehicle including a camera (3), a display screen (4) and a control unit (5) connected to one another. The display screen shows a picture taken with the camera of the area immediately behind the vehicle and the control unit (5) superimposes a marshalling mark (11, 13) on the picture when the vehicle is in a marshalling mode. The marshalling mode ensues regardless of which direction the vehicle is being driven in.

13 Claims, 2 Drawing Sheets

METHOD AND APPARATUS FOR SIMPLIFYING MARSHALLING WITH A VEHICLE

CROSS-REFERENCE TO RELATED APPLICATIONS

The present application is a continuation patent application of International Application No. PCT/SE2003/001779 filed 13 Nov. 2003 which was published in English pursuant to Article 21(2) of the Patent Cooperation Treaty, and which claims priority to Swedish Application No. 0203732-3 filed 17 Dec. 2002. Said applications are expressly incorporated herein by reference in their entireties.

TECHNICAL FIELD

The present invention relates to a marshalling apparatus for a vehicle and a method for facilitating the marshalling of a vehicle.

BACKGROUND OF THE INVENTION

Certain modern vehicles are equipped with some form of camera which is capable of showing a picture of the area behind the vehicle. Such a camera can make it easier for a driver to reverse drive the vehicle, which is the primary object of equipping passenger cars with such cameras. For heavier vehicles, such as trucks, buses and the like, this obviously also facilitates reversing, but in this case such a camera also has a safety-enhancing effect by showing what is situated immediately behind the vehicle, where the view is otherwise obscured.

For heavier vehicles the reversing camera makes it possible to see what is situated immediately behind the vehicle. This may be of help not only in seeing whether a person is standing behind the vehicle, for example, but also in marshalling the vehicle. In marshalling a vehicle it is a question of placing the vehicle in a desired position with as little deviation as possible; for example, where a vehicle with tail lift is being reversed towards a loading platform. Another example is when a tractor vehicle is to couple up to a trailer vehicle.

In its simplest embodiment a reversing camera is an ordinary analog video-camera that shows a picture on a display screen. Digital reversing cameras also exist in which the picture can either be shown directly on a display screen or in which the picture may first undergo some form of signal processing in a control unit before being shown on the display screen. The signal processing may consist, for example, of adjusting the contrast and brightness of the picture so that a clear, useable picture is obtained regardless of the weather and time of day. Reversing cameras are often equipped with wide-angle lenses which give a distorted image, for which reason the control unit can also compensate for display defects of the wide-angle lens.

WO 0124527, EP 1022903, JP 2002019492 and JP 2000280822 describe systems to facilitate the reversing of a passenger car in which, among other things, a predicted vehicle movement, estimated by measuring the angle of the vehicle wheel deflection, is shown on the display screen. JP 2001010431 furthermore describes a method of displaying a guide line which is constantly adjusted to the angle of the vehicle wheel deflection. This varying guide line is intended to facilitate parking of the passenger car. US 20020149673 A1 describes an apparatus to assist a driver in reversing a vehicle having a tow ball towards a trailer vehicle with a ball coupling.

These methods may perhaps make reversing easier for inexperienced drivers, and they can possibly function satisfactorily in the case of passenger cars where the camera is in a known, fixed location low down. For heavy vehicles each individual vehicle would need to be programmed separately since the reversing camera has a different location depending on the type of vehicle and equipment.

Furthermore, the documents cited do not solve the problem of making it easier to position a vehicle into a desired position when marshalling the vehicle. The systems described are only designed to operate when reversing the vehicle, not when the vehicle is being marshaled, nor does the driver receive any help in positioning a component fitted to the vehicle in relation to a desired position when marshalling the vehicle.

SUMMARY OF THE INVENTION

An object of the invention therefore is to provide a marshalling apparatus which makes it easier for a driver to marshal a vehicle into a desired position and a method which makes it easier for a driver to marshal a vehicle into a desired position.

The object of the invention is achieved through the implementation of a marshalling mode that is in effect regardless of which direction the vehicle is being driven. The mode is implemented using a marshalling apparatus on the motor vehicle that includes a camera, a display screen and an interconnecting control unit. The display screen shows a picture, taken with the camera, of the area immediately behind the vehicle, and the control unit superimposes a marshalling mark on the picture when the vehicle is in the marshalling mode.

The method of the invention achieves the object in that it consists of the following steps: using a camera mounted on the back of the vehicle to take a picture of the area immediately behind the vehicle, displaying the picture on a display screen in the driver's cab, superimposing one or more marshalling marks on the picture and displaying said marshalling mark regardless of which direction the vehicle is being driven in.

This first embodiment of the marshalling apparatus according to the invention provides a marshalling apparatus for a vehicle, which comprises (includes, but is not necessarily limited to) a display screen, on which a picture of the area immediately behind the vehicle can be displayed, on which picture a marshalling mark is superimposed regardless of which direction the vehicle is being driven. The advantage to this is that with the aid of the marshalling mark a driver of the vehicle can easily marshal the vehicle into a desired position, a component mounted on the vehicle being positioned in a desired relationship to a an external component.

In an advantageous further development (variation or adaptation) of the marshalling apparatus according to the invention, the marshalling mark is displayed only when the vehicle is being driven below a predefined speed. The advantage to this is that the marshalling mode can be deactivated automatically when the vehicle is being driven on a main road, for example.

In an advantageous further development of the marshalling apparatus according to the invention, the marshalling mark is displayed only when the vehicle is situated in a predefined geographical area. The advantage to this is that the marshalling mode can be activated automatically when the vehicle is running in an area in which marshalling will occur, for example in the loading area in a port.

In an advantageous further development of the marshalling apparatus according to the invention, the marshalling mark shows the direction to a component mounted on the vehicle. The advantage to this is that the driver can see where on the vehicle a component is mounted, even when this is hidden from the camera.

In an advantageous further development of the marshalling apparatus according to the invention, the marshalling mark shows an external contour corresponding to an activated mode for a component mounted on the vehicle. The advantage to this is that the driver, for example, can see where a raised tail lift will come to rest when it is lowered.

In an advantageous further development of the marshalling apparatus according to the invention, the marshalling mark shows distance lines. The advantage to this is that the driver can see how far it is between the rear edge of the vehicle and an external component.

In an advantageous further development of the marshalling apparatus according to the invention, the marshalling apparatus comprises a programming state in which one or more marshalling marks can be defined and saved. The advantage to this is that a user can himself easily program a new marshalling mark by physically marking the desired marshalling mark.

A method according to the invention for facilitating the marshalling of a vehicle comprises the following steps: using a camera mounted on the back of the vehicle to take a picture of the area immediately behind the vehicle, displaying the picture on a display screen in the driver's cab and superimposing one or more marshalling marks on the picture regardless of which direction the vehicle is being driven. The advantage to this method is that with the aid of one or more marshalling marks the driver can easily marshal the vehicle into a desired position, in which a component mounted on the vehicle is positioned in a desired relationship to an external component.

In an advantageous further development of the method according to the invention, the method includes a step in which a marshalling mark is programmed by physically marking the desired marshalling mark. The advantage to this is that a user can himself easily program a new marshalling mark without the need for expensive or complicated special equipment.

BRIEF DESCRIPTION OF THE DRAWINGS

The invention will be described in greater detail below, with reference to examples of embodiments shown in the accompanying drawings, and in which.

DESCRIPTION OF THE PREFERRED EMBODIMENTS

The exemplary embodiments of the invention, together with further developments described below, must be regarded solely as examples and in no way limiting to the scope of the patent claims.

Figure 1:
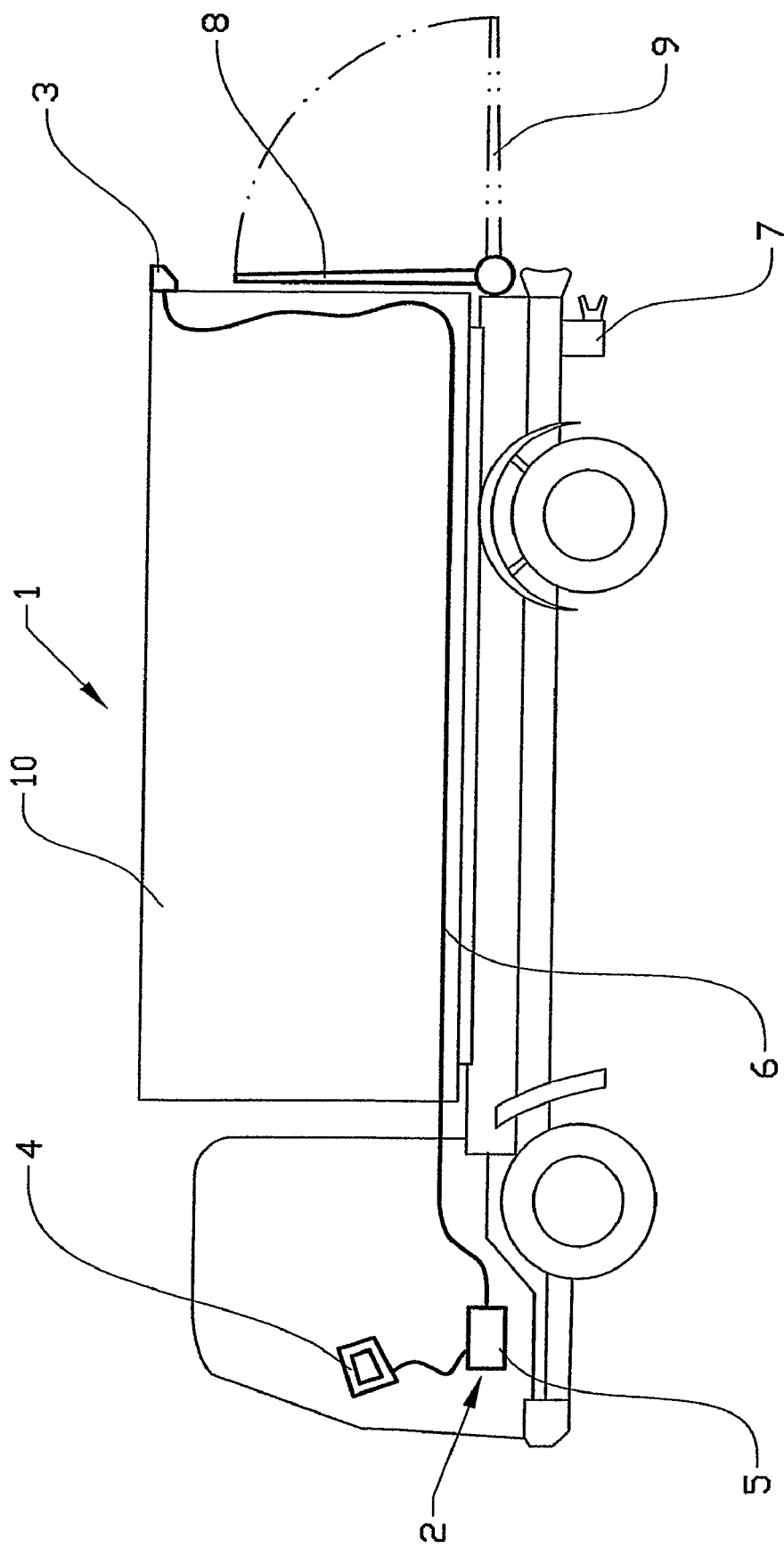
FIG. 1 shows a marshalling apparatus configured according to the teachings of the present invention when mounted on a truck.

FIG. 1 shows a marshalling apparatus 2 according to the invention mounted on a vehicle 1. The marshalling apparatus is mounted on the vehicle in a conventional manner; that is to say, a camera 3 is mounted anywhere on the rear part of the vehicle so that its picture frame covers an area immediately behind the vehicle. The display screen 4 is mounted at a suitable position in the driver's cab. The use of a display screen situated in the vehicle, for example the display screen used for navigation and the like, is advantageous. The control unit 5 is mounted at a suitable location on the vehicle, preferably somewhere in the driver's cab. The camera 3, the display screen 4 and the control unit 5 are connected to one another by suitable cabling 6.

In the example described herein, the marshalling apparatus is mounted on a truck 1. The truck is equipped with a box body 10, a tail lift 8 and a towing device 7 for a trailer vehicle. The camera 3 is mounted on the box body 10, above the doors and not centered in relation to the center-line of the vehicle. The towing device 7 is mounted on the rear end post and is hidden from the camera.

Marshalling a vehicle means that the vehicle is to be positioned into a desired position as precisely as possible. This means that the vehicle is moved both forwards and backwards at a low speed until the desired position is reached. The accuracy requirements when marshalling may vary depending on the intended aim. When marshalling a timber truck, the requirements are relatively low since the timber crane has a long reach. When a tractor vehicle is to couple up to a trailer vehicle, however, the requirements are exacting since the towing device of the tractor vehicle must be docked against the towing device of the trailer vehicle. Typical instances of marshalling include, for example, coupling up a trailer vehicle, when loading and unloading goods and when loading containers on and off and the like.

The control unit 5 controls when the camera picture is to be displayed on the display screen. The camera picture can be shown either when the control unit receives an external signal that the picture is to be displayed, or when the control unit, as a function of some condition, determines that the picture is to be displayed. The control unit is connected to the rest of the vehicle electrical system which means that it can obtain information on the state of the vehicle. It is therefore possible to enter one or more conditions in the control unit so that the control unit itself can determine when a picture is to be displayed. In the first example described herein, the condition is such that the picture display is activated when the reverse position is activated. Thereafter, the picture display is activated regardless of which direction the vehicle is being driven until such time as the vehicle is driven at a speed which exceeds a predefined value. When this condition is fulfilled, the vehicle is in a marshalling mode. This condition ensures that a picture is displayed on the display screen throughout the marshalling process, both when the vehicle is being driven forwards and when it is being driven in reverse. The predefined speed is set so that the vehicle can be marshaled without the picture display being deactivated. A suitable marshalling speed may be less than 20 km/h, for example, but this speed may also be higher depending on the type of marshalling. It is advantageous if the driver can himself adjust this speed, for example on a menu in the instrument.

The advantage in using this condition is that the camera picture will be displayed when the vehicle is being marshaled and not just when the vehicle is reversing. This is preferable since when marshalling it is advantageous for the driver to be able to see the picture both when driving forwards and when reversing. In this example the driver has uninterrupted access to a picture of the area behind the vehicle throughout the marshalling process.

It is also possible to activate a picture display with a separate switch. The switch can either be a two-way switch in which one position means that a picture display is activated, or a spring return switch in which the picture display is activated by a switch and in which the picture display is then deactivated either by the switch or by some other event, for example when the vehicle is driven in excess of a predefined speed.

Yet another possibility is to use GPS to define certain geographical marshalling areas within which the vehicle will automatically be in a marshalling mode during which the picture display is activated. This may be advantageous, for example, for vehicles in road construction. The vehicle loads material in one area and then drives to another area in which the material is to be unloaded. In this case the loading area and the unloading area can then be defined as marshaling areas. During transport the display screen can display other information without the driver needing to switch the picture display over.

It is obviously also possible for the driver himself to adjust the condition for the picture display via the vehicle menu system, that is to say for he himself to define one or more marshalling modes best suited to a driving situation.

Where necessary, the control unit 5 can also perform conventional image processing, for example adjustment of the picture contrast. In addition, the control unit 5 adds one or more marshalling marks to the picture displayed.

A marshalling mark is a mark which is added to the picture. This mark makes it easier for the driver to interpret the picture displayed on the display screen. A marshalling mark can, for example, show the maximum extension of a movable component mounted on the vehicle, such as the outer contour of a tail lift 8 in the lowered position 9. A marshalling mark for a tail lift may consist, for example, of two points showing the corners of the tail lift in the lowered position or lines showing the external contour of the entire tail lift in the lowered position.

A marshalling mark can also show the direction to a component mounted on the vehicle. Such a component may be a towing device 7, for example, which is mounted so that it is hidden from the camera, possibly under the superstructure of the vehicle, for example. This marshalling mark may be displayed as a line, for example. Since the towing device 7 is hidden from the camera, the line cannot terminate at the towing device 7. The line therefore shows the direction to the towing device 7, which means that the imaginary continuation of the line passes though the towing device 7. This means that when the driver is to couple up a trailer vehicle and makes the trailer vehicle towing device follow the line on the picture, the towing devices of the vehicle and trailer vehicle will dock together. Since the towing device on a truck and a trailer vehicle are coupled together in the same plane, this marshalling mark presents no parallax error problems caused by different towing device heights on the truck and the trailer vehicle.

Figure 2:
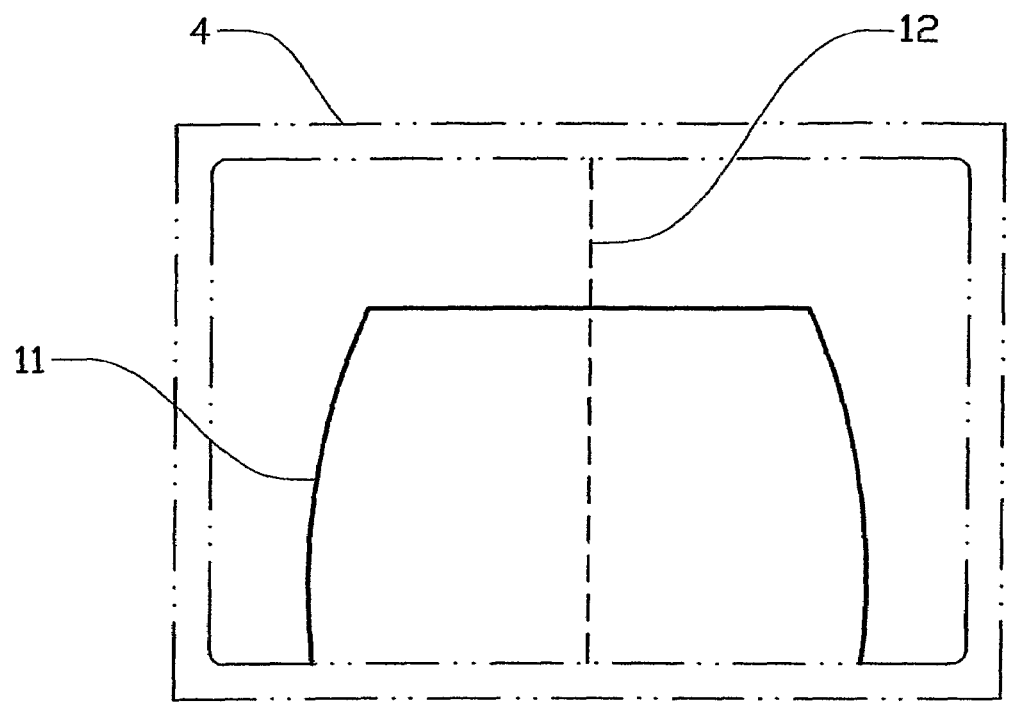
FIG. 2 shows a first example of an embodiment of marshalling marks according to the invention.

FIG. 2 shows an example of marshalling marks. The display screen 4 displays a picture of the area immediately behind the vehicle and two marshalling marks 11 and 12 superimposed on this picture. In this example the camera 3 is mounted centrally on the vehicle. The marshalling mark 111 shows the external contour of a tail lift in the lowered position 9, the marshalling mark 12 shows the direction to a towing device 7 mounted on the vehicle. The marshalling mark 11 shows external contours of the tail lift in the lowered position 9 as they appear on the picture; that is to say, the distortion of the lens makes the rectangular tail lift 8 assume another shape. In this example the marshalling mark 12 is a straight line since the camera is mounted centrally.

Figure 3:
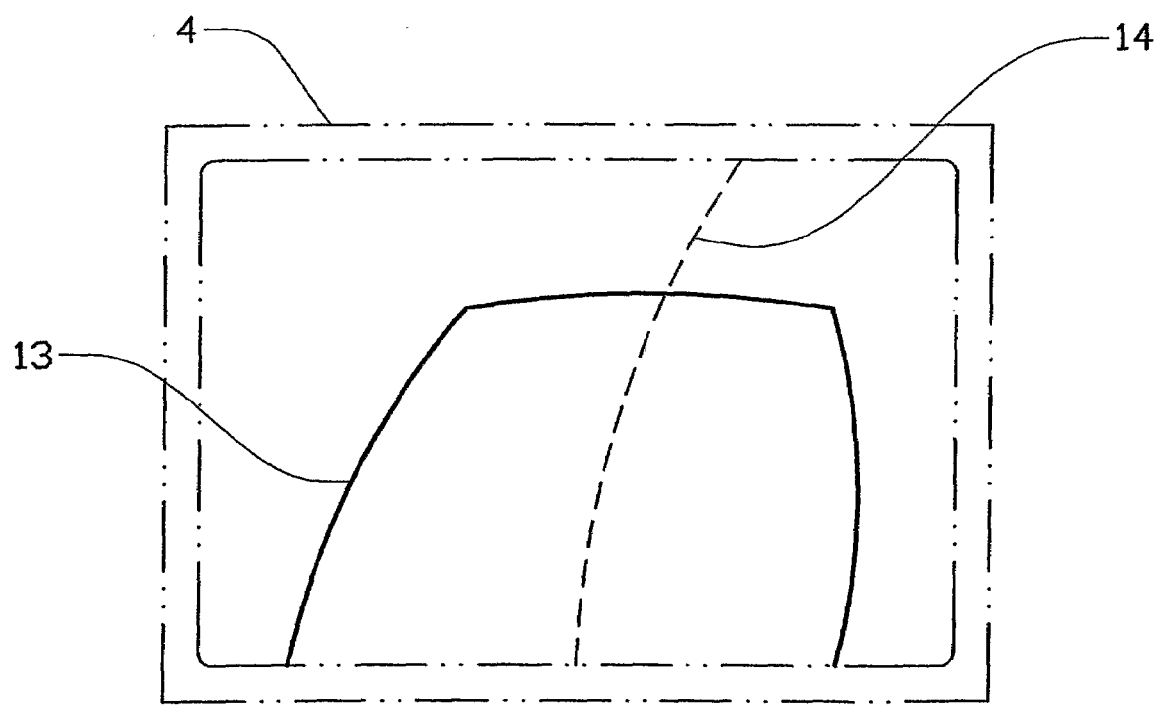
FIG. 3 shows a second example of an embodiment of marshalling marks according to the invention.

FIG. 3 shows corresponding marshalling marks, 13 and 14, as they may appear when the camera is not mounted centrally on the vehicle. The marshalling mark 12 shows the external contour of a tail lift in the lowered position 9, the marshalling mark 13 shows the direction to a towing device 7 mounted on the vehicle. This clearly shows that the distortion of the lens affects the appearance of the marshalling marks. Since the marshalling marks are superimposed and saved as they appear through the camera, no complex and expensive image processing of the picture or of the marshalling marks is required in order to compensate for the deviations.

Yet another marshalling mark can show where the material on a tipper truck will land when the platform body is tipped. This may be advantageous, for example, in road construction. This may be a horizontal line or a marked area, for example. Furthermore, one or more lines can show, for example, the longitudinal extent of the vehicle, which is advantageous for container vehicles, for example. This makes it easier, for example, to reverse the vehicle in under a container standing on support legs. For a vehicle handling waste containers or load changers, for instance, it is advantageous to show a marshalling mark in the form of the area in which the container or the load changer will come to rest when it is offloaded. Lines showing where refuse skips, for example, are to be hitched onto the vehicle can also be another usable marshalling mark.

Yet another advantageous marshalling mark is distance lines. One or more lines at a predefined distance from the rear edge of the vehicle are displayed on the display screen. This means that the driver can easily see how far it is from the rear edge of the vehicle to an external object, such as a parked car. It is also feasible to show a grid with each square, for example, representing 5 meters.

When the vehicle must be marshaled towards a loading platform, for example, the driver starts to reverse towards the loading platform. When the driver activates the reverse position on an automatic gearbox or engages the reverse gear on a manual shift gearbox, a picture of the area behind the vehicle is displayed on the display screen. At the same time a marshalling mark in the form of the external contours of the tail lift in the lowered position are displayed on the display screen, superimposed on the camera picture. The driver then sees precisely where the tail lift will come to rest when it is lowered. This makes it considerably easier for the driver to marshal the vehicle towards the loading platform.

Depending on the location of the loading platform, it may be necessary to reverse and move forwards a number of times in order to locate the tail lift in the correct position relative to the loading platform. Since the picture is displayed throughout the marshalling process and not just when reversing, the driver can also follow the lowered position of the tail lift on the display screen when driving forwards. For example, a driver cannot always reverse towards a loading platform at right angles. He can then reverse right up to the loading platform and then straighten up the vehicle by driving forwards whilst the tail lift is being optimally positioned.

Since this vehicle is fitted with a towing device, a marshalling mark is also displayed showing the direction to the towing device. This mark consists of a line on the picture in which the end of the line indicates the position of the towing device. This can be used when a trailer vehicle is to be coupled up. When a trailer vehicle is to be coupled to a tractor vehicle, it is easiest to reverse so that the towing device of the tractor vehicle follows the marshalling mark in the picture. The towing devices of the vehicles will then be docked against one another. This also makes it possible to couple up a trailer vehicle standing slightly offset in relation to the tractor vehicle. Normally the vehicles must be lined up with one another when coupling together since the driver cannot see the trailer vehicle towing device.

Owing to the fact that the camera is located asymmetrically on the vehicle and also so far above the ground, it is difficult for the driver to get a good idea of precisely where on the vehicle the towing device is positioned. Since the camera is fitted by an external vehicle builder, the camera may be located in a number of different positions, some of which can make it extremely difficult to distinguish from the picture displayed where on the vehicle a component is located. A line in the picture that shows where the component is located, or the direction to the component when the component is fitted where it is hidden, can therefore make it easier to hitch up a trailer vehicle, for example. This line compensates partly for the angular error in relation to the component to which the camera and the camera location give rise, and partly for the optical distortion which the wide-angle lens produces. As a result, the driver at all times has a good idea of where on the vehicle a component is mounted.

Reversing cameras are most often fitted with a wide-angle lens. This wide-angle lens has an extremely wide field of view and is not straight-imaging, which means that the picture shown exhibits optical deviations. This type of lens is used since the primary aim with a reversing camera is to be able to see whether there is anybody behind the vehicle, not to obtain a detailed straight-imaging picture of a part of the area behind the vehicle. On a passenger car in which the camera is mounted low down and centrally, this is no great problem. On a heavy vehicle the camera may be mounted both high up (on the order of four meters above the ground) and non-centrally (off-center). This means that the picture displayed will not be particularly detailed and will therefore be difficult to interpret when it comes to making out details. This is exacerbated in that the picture is displayed on a relatively small display screen and that the lens is in an exposed environment which means that the lens may be more or less subject to fouling. On such a picture, it can be extremely difficult to see precisely where on the vehicle a towing device, for example, is mounted.

When the camera is mounted on the rear end post, it can also be difficult to judge exactly where a tail lift, for example, will come to rest in the lowered position. In this case too, therefore, a marshalling mark for the tail lift in the lowered position will facilitate marshalling of the vehicle.

In a preferred embodiment, the marshalling apparatus comprises a programming state, in which a marshalling mark can be programmed. Since the camera can be mounted at several different positions on the vehicle, depending among other things on which type of vehicle it is, it is advantageous if it is easy to program the marshalling marks. That the camera may have various locations stems partly from the fact that it is often the external vehicle builder who fits the camera, and partly from the fact that different drivers have different requirements for the camera location, depending on the driving situation.

In addition, the camera may be moved, for example, when a vehicle is being adapted to some other function. Since the camera may be very exposed, it can easily be damaged, which means that it needs to be replaced in the event of such damage. Upon replacement, the camera position may be altered and/or some other type of camera may be fitted, for example one with a different lens. A vehicle can also be converted or reconfigured, for example, so that the position of the towing device is altered. This makes it impractical to have a preprogrammed marshalling mark from the factory; rather the external vehicle builder or the haulage contractor himself needs to have the facility for readily programming a marshalling mark.

The programming of a marshalling mark involves clearly marking the marshalling mark that is to be programmed, so that it can be readily distinguished by the control unit. This can be done in the case of a tail lift, for example, by marking external contours of the tail lift with a special, contrasting color, such as with a blue tape, for example, so that the control unit can easily differentiate between the marshalling mark and the rest of the picture. It is also possible, for example, to mark out only the corners of the tail lift. When this marking is completed, the control unit is set to a programming state. This can be done, for example, with the aid of the vehicle's existing menu system.

In the programming state, the control unit detects the marking made and saves it in a memory as a marshalling mark. Only the marshalling mark is saved in the memory so that it can easily be superimposed on a picture when the vehicle is marshaled. Multiple marshalling marks can be saved in the memory, either in the same memory so that all marshalling marks are displayed simultaneously, or in separate memories so that the marshalling mark(s) which the driver wishes to see can be superimposed on the picture. Each marshalling mark can be saved under a unique name in the vehicle menu system. The driver can then select from the menu system which marshalling marks are to be displayed.

The programming of a marshalling mark to indicate the direction to a towing device is done in a similar manner. In this case a mark is placed from the mid-point of the towing device straight back from the towing device, parallel with the ground. This can be done, for example, by drawing a blue tape straight back from the towing device parallel with the ground. The part of the mark that is visible in the picture is in this case saved as a marshalling mark which shows the direction to the towing device. In this example it is advantageous for the vehicle to be standing on a level surface since the height of the mark above the ground must correspond to the height of the towing device above the ground.

Other marshalling marks are also programmed in a similar way. The marshalling mark can be made in any manner, for example with a contrasting color, pattern or symbols. The important thing is that the control unit be capable of clearly detecting the mark so that it can be saved as a marshalling mark.

Since the facility for programming a marshalling mark by marking a physical position is integrated into the control unit, this makes programming considerably easier. This means that a workshop, a haulage contractor or a driver can undertake the programming themselves, without expensive special accessories. Furthermore, displaying a marshalling mark made in this way takes up little memory capacity and little processing power.

Marking a physical position is also an easy way of compensating for angular errors caused partly by the lens and partly by the camera location, without the control unit having to perform complicated calculations or image processing. Nor is it necessary to have the control unit recalculate the picture in order to compensate for lens deviations, since the marshalling mark corresponds to the physical component seen through the camera. Programming with the camera mounted in its correct place also means that the camera location is not critical either.

Where there are multiple marshalling marks the driver can select when and/or which marshalling marks are to be displayed in different cases. For example, a driver can choose between marshalling marks that correspond to different-sized load changers, depending on which load changer is being used. These choices are made in the vehicle menu system. It is also possible for the driver to define one or more marshalling modes in the menu system.

It is also possible to select how a marshalling mark is to be represented on the screen. A marshalling mark may be displayed, for example, as a solid line, as a dashed line, as a dotted line or as an area with some form of grid system. It is also possible to select the color of a marshalling mark. For example, a driver can opt to display two marshalling marks representing two different-sized load changers simultaneously. One load changer can then be represented by one color and the other load changer by another color. These choices are made in the vehicle menu system.

The method according to the invention for facilitating the marshalling of a vehicle comprises the following steps: using a camera to take a picture of the area immediately behind the vehicle, displaying the picture on a display screen in the driver's cab and superimposing one or more marshalling marks on the picture. The marshalling marks are stored in a control unit and are superimposed on the picture. One or more marshalling marks can be displayed simultaneously. In addition one or more conditions may be set for when a marshalling mark is to be displayed. These conditions can either be predefined or set by the user, for example by means of the vehicle menu system.

One example of an embodiment of the method according to the invention for facilitating marshalling of a vehicle includes a step in which a marshalling mark is programmed. This is done in that the marshalling mark to be programmed is physically and clearly marked, for example with a separate color or a special pattern, so that the control unit can easily distinguish it from the camera picture. The marshalling mark corresponding to the physical mark is saved in a memory. This marshalling mark can then be displayed by superimposing it on the picture displayed. The marshalling mark can then be used by the driver so that the driver can easily marshal the vehicle into the desired position since the maximum extension of a movable component mounted on the vehicle, for example, can clearly be seen from the picture displayed.

The invention must not be regarded as being limited to the examples of embodiment described above, a number of further variants and modifications being feasible within the scope of the following patent claims. The marshalling apparatus can also be used, for example, on trailer vehicles or on other heavy vehicles such as dumper trucks and the like.

What is claimed is:

1. A marshalling apparatus for a motor vehicle which includes a tail lift mounted thereon that is operable to assume a first, deactivated condition and a second, activated condition in which the tail lift is lowered, said marshalling apparatus comprising a camera, a display screen interconnected with a control unit, the display screen displays a picture taken with the camera of the area immediately behind the vehicle and in which the control unit superimposes a marshalling mark on said picture when the vehicle is operating in a marshalling mode, and wherein the marshalling mode ensues regardless of whether the vehicle is being driven in a forward direction or a reverse direction and said marshalling mark indicates an external contour of said tail lift corresponding to the lowered, activated condition of said tail lift.

2. The marshalling apparatus as recited in claim 1, wherein the marshalling mode ensues when the vehicle is being driven below a predefined speed.

3. The marshalling apparatus as recited in claim 1, wherein the marshalling mode ensues when the vehicle is situated within a predefined, geographical area.

4. The marshalling apparatus as recited in claim 1, wherein the marshalling mark is displayed on the display screen as one or more points and/or lines and/or a continuous surface.

5. The marshalling apparatus as recited in claim 1, further comprising an additional marshalling mark that shows the direction to said tail lift.

6. The marshalling apparatus as recited in claim 1, further comprising an additional marshalling mark that shows the external contours of a component that can be coupled to the vehicle.

7. The marshalling apparatus as recited in claim 1, further comprising an additional marshalling mark that shows the external contours of a trailer vehicle coupled to the vehicle.

8. The marshalling apparatus as recited in claim 1, wherein the marshalling apparatus further comprises at least one distance line of which each represents a distance from the rear edge of the vehicle.

9. The marshalling apparatus as recited in claim 1, wherein the marshalling apparatus has a programming state in which a marshalling mark is defined.

10. The marshalling apparatus as recited in claim 1, wherein the control unit detects a physical delineation of a marshalling mark and stores the physical delineation in a memory.

11. A method for facilitating the marshalling of a vehicle which includes a tail lift mounted thereon that is operable to assume a first, deactivated condition and a second, activated condition in which the tail lift is lowered, comprising the following steps:
   using a camera mounted on the back of the vehicle to take a picture of the area immediately behind the vehicle,
   displaying the picture on a display screen in the driver's cab of the vehicle,
   superimposing on the picture, by means of the control unit, a marshalling mark corresponding to the lowered, activated condition of the tail lift, the marshalling mark being an external contour corresponding to the lowered, activated condition of said tail lift, and
   displaying the picture on the display screen with said marshalling mark regardless of whether the vehicle is being driven in a forward direction or a reverse direction.

12. The method as recited in claim 11, further comprising an additional marshalling mark which shows at least one of: (1) the direction to a component mounted on the vehicle, (2) the size of a component mounted on the vehicle, and (3) an assumed marshalling position for the vehicle.

13. The method as recited in claim 11, further comprising:
   physically marking the desired marshalling mark; and saving the desired marshalling mark in a memory.

* * * * *